United States Patent [19]
Dunphy et al.

[11] Patent Number: 5,399,854
[45] Date of Patent: Mar. 21, 1995

[54] EMBEDDED OPTICAL SENSOR CAPABLE OF STRAIN AND TEMPERATURE MEASUREMENT USING A SINGLE DIFFRACTION GRATING

[75] Inventors: James R. Dunphy, South Glastonbury; Gerald Meltz, Avon, both of Conn.; Mauro Varasi; Antonello Vannucci, both of Rome, Italy; Mario Signorazzi, Ciampino RM, Italy; Pietro Ferraro, Naples, Italy; Sabato I. Imparato, Gragnano NA, Italy; Claudio Voto, Naples, Italy

[73] Assignee: United Technologies Corporation, Hartford, Conn.

[21] Appl. No.: 207,993

[22] Filed: Mar. 8, 1994

[51] Int. Cl.⁶ .................................... H01J 5/16
[52] U.S. Cl. .................. 250/227.17; 250/227.14; 73/800; 356/32
[58] Field of Search ............ 250/227.17, 227.14; 73/800; 356/32

[56] References Cited

U.S. PATENT DOCUMENTS

| | | | |
|---|---|---|---|
| 4,761,073 | 8/1988 | Meltz et al. | 356/32 |
| 4,806,012 | 2/1989 | Meltz et al. | 356/32 |
| 4,970,385 | 11/1990 | Tatsuno et al. | 250/225 |
| 5,164,587 | 11/1992 | Caimi et al. | 250/227.17 |
| 5,265,475 | 11/1993 | Messinger et al. | 73/800 |

*Primary Examiner*—David C. Nelms
*Assistant Examiner*—Steven L. Nichols
*Attorney, Agent, or Firm*—Gerald L. DePardo

[57] ABSTRACT

An embedded optical sensor has a plurality of layers 10–20 and an optical fiber 21 with a fiber grating 28, disposed between the layers 14,16. The layers 10–20 comprise filaments 22 and resin 24 which have different thermal expansion coefficients and the filaments 22 are oriented so as to create unequal transverse residual stresses that act through the geometry of a resin-rich region that surrounds on the grating 28 in the fiber 21. The unequal transverse residual stresses cause birefringence in the grating 28, thereby causing the grating 28 to reflect light 32 having two wavelengths with a predetermined separation, each along a different polarization axis. The wavelength separation and average wavelength between such separation have different sensitivities to temperature and strain, thereby allowing independent temperature and strain measurements using only a single grating. The birefringence is maximized when the filaments 22 of the adjacent layers 10,12 are oriented at 90 degrees with respect to the longitudinal (Z-axis) of the fiber 21.

32 Claims, 11 Drawing Sheets

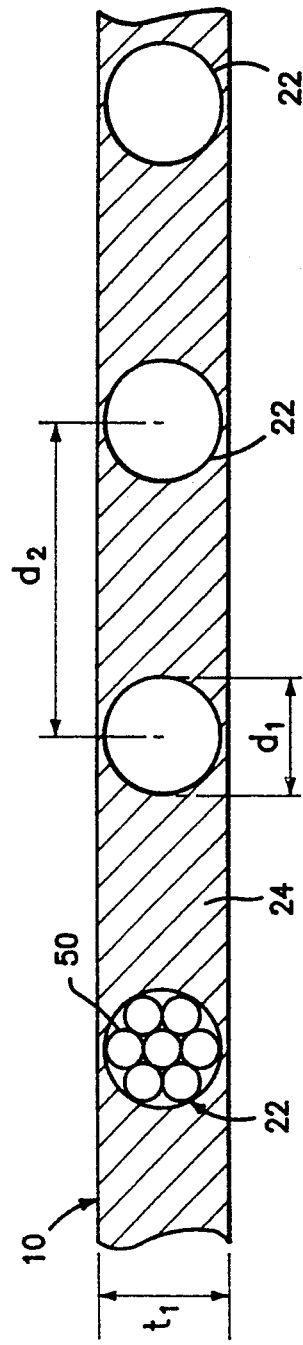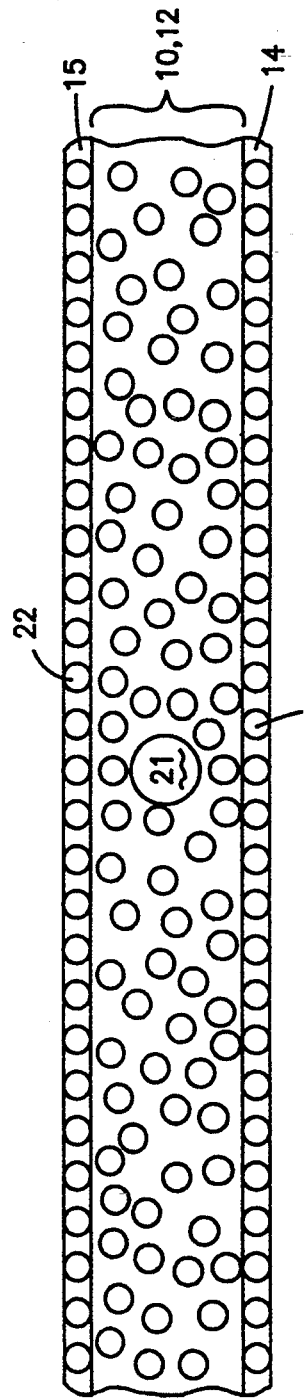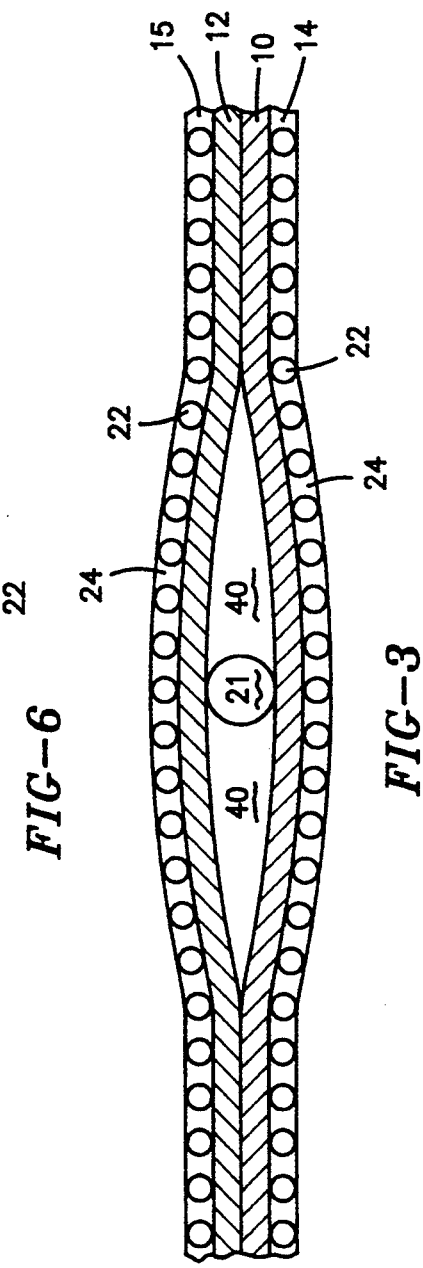

EMBEDDED OPTICAL SENSOR CAPABLE OF STRAIN AND TEMPERATURE MEASUREMENT USING A SINGLE DIFFRACTION GRATING

TECHNICAL FIELD

This invention relates to optical strain and temperature sensors, and more particularly to optical sensors employing structurally embedded fibers having Bragg gratings.

BACKGROUND ART

It is known in the field of strain sensors to embed an optical fiber having reflective elements, such as Bragg gratings, within a structure, as is described in U.S. Pat. Nos. 4,806,012, entitled "Distributed, Spatially Resolving Optical Fiber Strain Gauge" and No. 4,761,073, entitled "Distributed, Spatially Resolving Optical Fiber Strain Gauge" both to Meltz et al. The fiber containing gratings is also called a "fiber sensor." It is also known that optical fiber sensors can be embedded in composite materials or structures, thereby allowing strain and/or temperature measurement of the structure.

Typically, a broad wavelength band source light is launched into the fiber and the gratings reflect only a narrow wavelength band of the source light. The reflection wavelength of the gratings (i.e., the wavelength where a local maximum in reflection occurs), shifts as a function of both strain and temperature variation at the location of the gratings. Consequently, in order to determine strain independent of temperature variations, such a sensor requires a separate temperature measurement device (e.go, another grating). Thus, a single grating (or sensor) in such a configuration cannot provide temperature compensated strain measurement, nor strain compensated temperature measurement. Accordingly, the same inability to perform temperature and strain measurements from a single sensor exists for sensors embedded in structures.

Therefore, it would be desirable to provide an embedded optical fiber sensor which provides optical signals from a single grating from which both temperature and strain can be determined.

DISCLOSURE OF INVENTION

Objects of the invention include provision of an embedded optical fiber sensor which is capable of both temperature and strain measurements from a single grating.

According to the present invention, an embedded optical sensor includes an optical waveguide for confining incident light and return light; at least one reflective element is disposed within the waveguide in the path of the incident light, the reflective element having a first transverse axis and a second transverse axis perpendicular to the first transverse axis, the first and the second transverse axes both being perpendicular to a longitudinal axis; transverse stress means are provided for exerting forces on the reflective element so as to create unequal transverse stresses in the reflective element; the unequal transverse stresses creating birefringence in the reflective element, and the unequal transverse stresses changing with temperature thereby causing the birefringence to change with temperature; the birefringence causes a first peak reflection wavelength of the reflective element associated with a first polarization axis of the reflective element and a second peak reflection wavelength of the reflective element associated with a second polarization axis of the reflective element; a wavelength spacing exists which is the wavelength difference between the first peak and the second peak and an average wavelength exists which is the wavelength half-way between the first peak and the second peak; and the wavelength spacing has a sensitivity to temperature and strain which is different from that of the average wavelength, thereby allowing independent temperature and strain measurements with one of the reflective elements.

According further to the present invention, the transverse stress means comprises a composite structure surrounding the reflective element. According still further to the invention, the composite structure comprises reinforcing filaments having a predetermined orientation with respect the reflective element and a bonding material to hold the composite structure together.

Still further accord to the invention, the filaments adjacent to the reflective element are oriented in a direction that is not parallel to the longitudinal axis of the reflective element. Still further according to the invention, the composite structure comprises a plurality of layers each comprising the filaments and the bonding material.

In still further accord to the present invention, the waveguide is an optical fiber, and the reflective element is a bragg grating.

The invention represents a significant improvement over prior embedded optical fiber strain and temperature sensors, by allowing a single grating to provide signals from which both temperature and strain can be determined, thereby reducing the number of gratings or other sensors required to compensate for temperature variations and improving the integrity of temperature compensated strain measurement (because the temperature is measured at the desired compensation point). As a result, the invention provides for the possibility of temperature measurement from each of the gratings, temperature compensated strain measurement, or separately resolved strain and temperature measurement with a single grating.

The foregoing and other objects, features and advantages of the present invention will become more apparent in light of the following detailed description of exemplary embodiments thereof as illustrated in the accompanying drawings.

BRIEF DESCRIPTION OF DRAWINGS

FIG. 2 is a side cut-away cross-section view of a layer of the invention showing the reinforcing filaments, and resin between the filaments, in accordance with the present invention.

FIG. 3 is a cross-sectional side view of a plurality of layers having reinforcing filaments oriented perpendicular to the longitudinal axis of the optical fiber, showing a resin-rich region, in accordance with the present invention.

FIG. 6 is a cross-sectional side view of a plurality of layers having reinforcing filaments for an alternative embodiment, having reinforcing filaments oriented along the longitudinal axis of an embedded optical fiber, in accordance with the present invention.

BEST MODE FOR CARRYING OUT THE INVENTION

Figure 1:
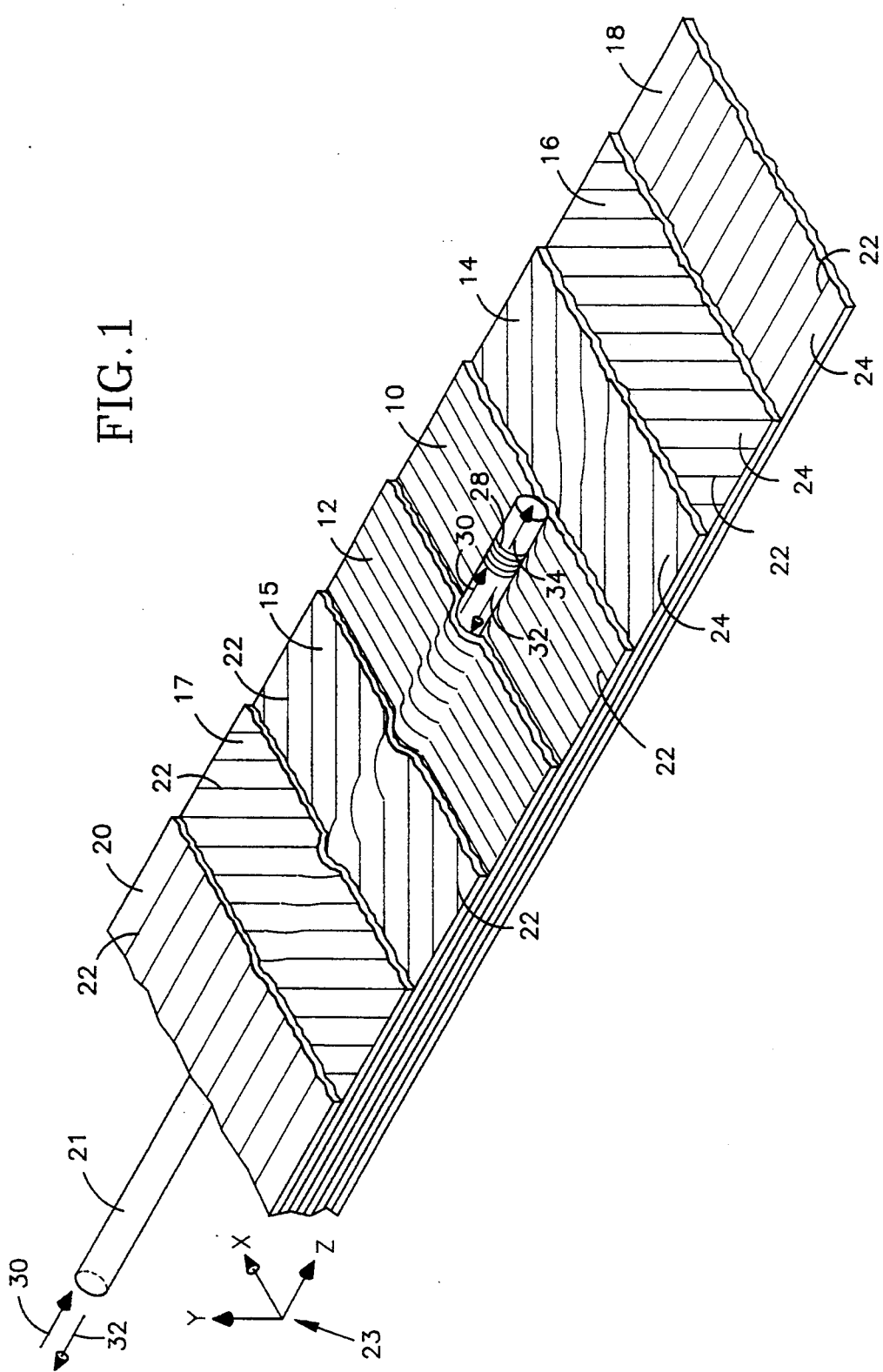
FIG. 1 is a cut-away perspective view of an embedded optical sensor showing a plurality of layers having reinforcing filaments making up a laminated structure having an optical fiber embedded therein, in accordance with the present invention.

Referring to FIG. 1, an embedded optical fiber sensor comprises a plurality of layers 10-20 (discussed hereinafter) and a non-birefringent optical fiber 21, embedded between the layers 10 and 12. The fiber 21 comprises a single spatial mode, Germania-doped, Silica core having a diameter of about 6 microns and a Silica cladding giving a total outer diameter (core and cladding) of about 125 microns. Other fiber compositions and sizes may be used if desired. Also, fibers with or without buffer coatings may be used if desired. The core of the fiber 21 has at least one reflective element 28, such as a Bragg grating, similar to that discussed in the aforementioned U.S. Patents to Meltz et al.

Each of the layers 10-20 comprise cylindrical reinforcing filaments 22 made of graphite which are embedded in the layers 10-20 in predetermined directions. The filaments 22 within each of the layers 10-20 are substantially parallel to each other. Between the filaments 22 are regions of polymer matrix 24, e.g., a thermal set epoxy resin, known in the industry. Other materials may be used for the filaments and other thermal set polymer matrix materials may be used for the regions therebetween, if desired. For example, the filaments 22 may be made of glass, fabric (e.g., nylon, cloth) or other materials. Also a given layer may instead be made of KEVLAR®, i.e., fiber glass reinforce polymer resin, or another material. Also, the filaments need not be cylindrical in shape. The layers 10-20 are also called "plies" and the total structure 8 is referred to as a "lay-up" (or laminate or composite structure).

For the lay-up of FIG. 1, the pair of layers 10,12, which are immediately adjacent to and surrounding the fiber 21, have the filaments 22 oriented along the X-axis of an XYZ coordinate axis system 23 which is 90 degrees from the longitudinal axis (Z-axis) of the fiber 21 along which light propagates. The next pair of layers 14,15 that surround the fiber 21 have the filaments 22 oriented at an angle of +45 degrees from the Z-axis. The layers 16,17 have the filaments 22 oriented at −45 degrees from the Z-axis, and the outermost layers 18,20 have the filaments 22 oriented along the Z-axis.

Accordingly, the lay-up of FIG. 1 has the pattern: [0,−45,+45, 90] Fiber [90,+45,−45, 0]. Such a pattern is referred to as a "quasi-isotropic symmetric lay-up". A quasi-isotropic lay-up, as is known, is a structure having an effective stiffness in the plane of the layers (i.e., in-plane stiffness) which is fixed independent of the orientation of the in-plane load applied to the structure. Also, the lay-up of FIG. 1 is called "symmetric" because orientation of the filaments 22 are symmetrical about the fiber 21 and about the plane between the layers 10,12). When the lay-up is symmetric, the resultant structure has minimum curling. Other filament orientations and other number of layers may be used if desired, as discussed hereinafter.

The lay-up of FIG. 1, having any variation of filament orientation, can be manufactured by a variety of methods. For example, the layers 10-20 may be pre-fabricated having the filaments 22 preimpregnated with resin 24 therebetween. The layers may then be assembled in the desired lay-up pattern with the fiber 21 located between the desired layers in the desired direction. This assembly is then consolidated in a closed-mold or an autoclave process. Alternatively, a dry cloth lay-up can be assembled in similar fashion for use in a closed, resin-injection molding process. For either process, the resin is raised to a temperature at which a chemical reaction occurs to cause polymerization (i.e., curing) of the matrix, which then hardens and is cooled. Other manufacturing techniques may be used if desired.

Referring now to FIG. 2, each of the filaments 22 is actually a twisted bundle of graphite fibers (or strands) 50 much finer than the filaments 22. The filaments 22 have a typical diameter $d_1$ of about 5 to 10 microns and are separated from each other in a given layer by a distance $d_2$ determined the by the desired percentage volume of reinforcing graphite (e.g., 50-70%) of the total volume of a given layer. The thickness $t_1$ of each layer is about the same as (or slightly thicker than) the diameter $d_1$ of the filaments 22. Other thicknesses, diameters, and percent volumes may be used if desired. Also, the filaments need not be a twisted bundle but may be solid.

It should be understood that FIG. 2 is an idealized isolated layer and that, in the laminated composite structure, the layers are likely not as well defined. For example, filaments from other layers may likely be shifted during the curing process and become relocated between the filaments shown and the resin 24 between the filaments combines with resin from other layers, thereby removing any distinct boundary between layers.

Referring again to FIG. 1, we have found that when the reinforcing filaments 22 of the layers 10,12 are oriented at an angle of 90 degrees with respect to the fiber 21, strong unequal transverse residual stresses exist in the structure which induce a corresponding strain in the fiber 21 and in the grating 28. The term "transverse" stress is used herein to indicate stresses in the fiber 21 along the X-axis and Y-axis directions of the lay-up (perpendicular to the longitudinal Z-axis of the fiber 21). In particular, transverse residual stress components exist in the plane of the layers along the X-axis as well as perpendicular to the plane of the layers (i.e., through the thickness) along the Y-axis. Because the transverse stresses are not equal, a strong differential strain is imposed on the fiber 21, thereby inducing a birefringence in the portion of the fiber 21 and the grating 28 which are embedded within the structure. This birefringence causes the bragg grating to have a different reflection wavelength for each polarization, as discussed hereinafter.

We have also found that this induced birefringence in the fiber 21 and grating 28 varies as a function of temperature. This effect is caused because the overall structure in the region of the fiber exhibits a different coefficient of thermal expansion in the X-axis direction than in the Y-axis direction in the local vicinity of the fiber 21. As a result, the birefringence changes with changes in temperature. The birefringence is calibrated for a given structure and used to determine the temperature change of the structure, determine temperature compensated strain, or provide both a temperature signal and a strain signal.

Referring now to FIG. 3, if the reinforcing filaments 22 of the two layers 10,12 are not parallel to the fiber 21, an eye-shaped region 40 of the resin 24 is formed around the fiber 21. This region is formed because during the process of consolidation and polymerization, the reinforcing filaments 22 make a bridge over the fiber 21, leaving an empty eye-shaped space around the fiber 21. This space is then filled by the resin during the curing cycle. Some of the factors that determine the shape and dimensions of the eye-shaped region 40 are: the angle between the fiber 21 and the filaments 22 of the adjacent layers 10,12; the diameter of the optical fiber 21; the compliance of the filaments 22; and the applied pressure during consolidation.

Due to the different thermal expansion coefficients of the optical fiber 21, the resin 24, the filaments 22, and the lay-up as a whole, when the composite structure is cooled down from the curing temperature to room temperature, the aforementioned unequal transverse residual stresses appear around the optical fiber 21. These unequal stresses cause the fiber to exhibit strong birefringence. Since the birefringence is the result of residual thermal stresses, when the temperature of the structure changes the amount of birefringence changes.

Figure 4:
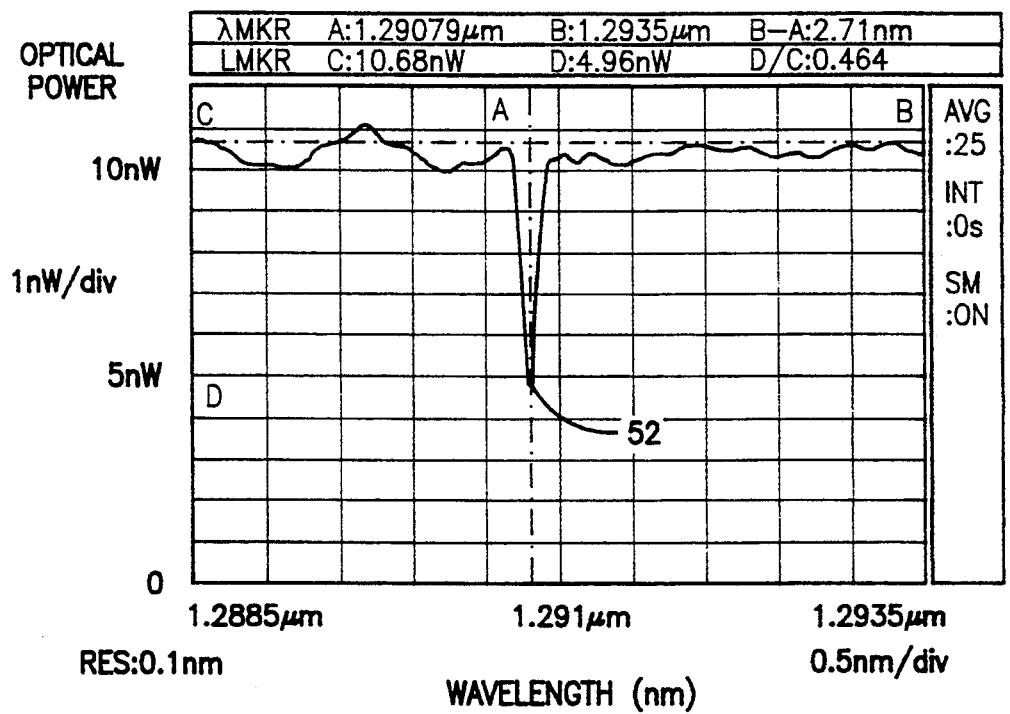
FIG. 4 is a graph of a sensor transmission profile vs. wavelength for a fiber sensor before the sensor has been embedded in a structure.
Figure 5:
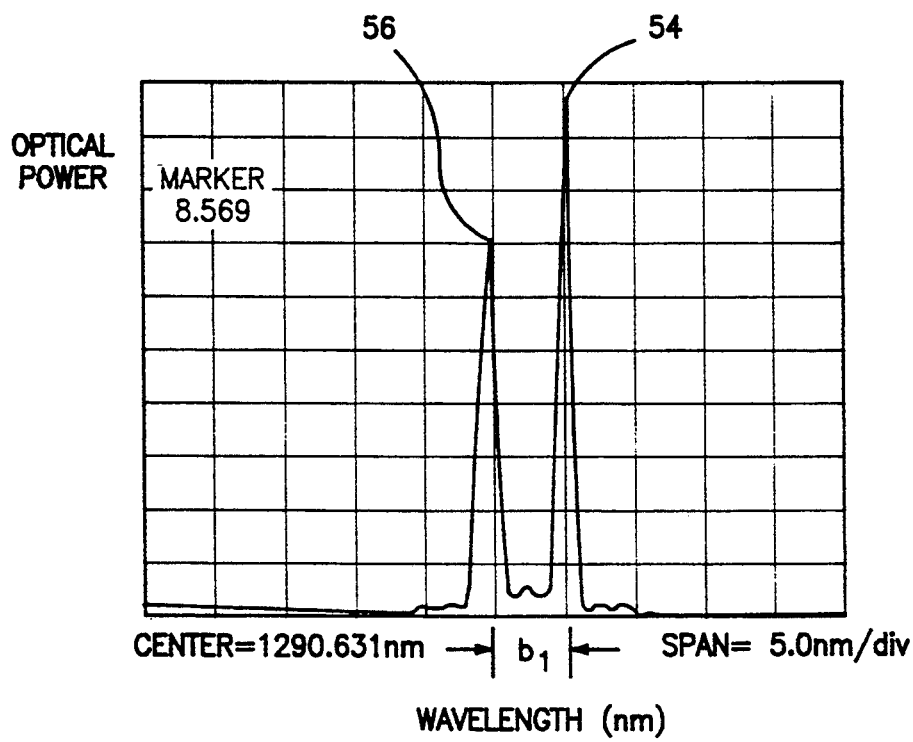
FIG. 5 is a graph of the sensor reflection profile vs. wavelength for the fiber sensor of FIG. 4 after the sensor has been embedded in a structure having adjacent layer filaments perpendicular to the fiber, in accordance with the present invention.

In particular, referring to FIG. 4, before being embedded in a structure, a fiber sensor has a single local minimum in its transmission profile at a predetermined wavelength, e.g., 1290.79 nanometers, as indicated by a point 52. Referring to FIG. 5, when the sensor of FIG. 4 is embedded in a structure having the adjacent filaments 22 perpendicular to the fiber 21 (FIG. 3), and having a lay-up of: [same] [90,−45,+45,0,0,+45,−45,90] fiber [90,−45,+45,0,0,+45,−45,90] [same] [same] [same] (the angles measured from the longitudinal axis of the fiber), the reflectivity profile exhibits two local peaks 54,56 in reflectivity having a wavelength separation b1, e.g., 0.569 nanometers, exhibiting a first reflection wavelength 54 and a second reflection wavelength 56, each corresponding to a different polarization. Such wavelength separation is caused by the aforementioned induced fiber birefringence.

More specifically, the resin-rich region 40 around the fiber 21 (FIG. 3) together with the perpendicular orientation of the adjacent filaments 22 and the other layers in the composite structure impose unequal components of residual transverse stress on the fiber sensor. The unequal stresses are due in-part to the unequal volume of resin in the resin-rich region 40 along the X-axis in comparison with that along the Y-axis. Also, the volume fraction of resin for a given layer may likely be a factor in the resulting stress concentration on the fiber. All these factors create a maximum birefringence in the fiber 21.

The transverse stresses are also due to the net thermal expansion coefficient along the length of the filaments being much different from the in-plane coefficient perpendicular thereto (i.e., unequal net perpendicular in-plane thermal expansion coefficients in each layer), and because the filaments of the layers 10–20 are not all oriented in the same direction. In particular, the thermal expansion coefficient of the filaments is different from the thermal expansion coefficient of the resin.

Referring now to FIG. 6, if the fiber 21 is oriented parallel to the filaments 22 of the adjacent layers 10,12, the eye-shaped resin-rich region 40 of FIG. 3 is essentially non-existent. This is because the reinforcing filaments close-in substantially uniformly around the fiber 21 without deflecting.

Figure 7:
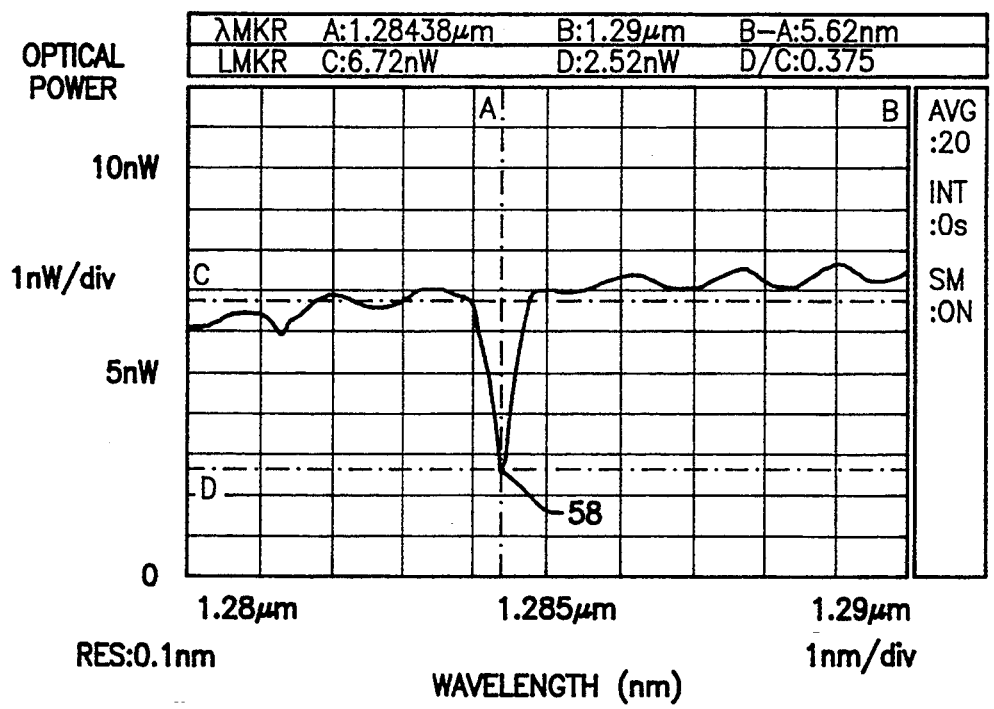
FIG. 7 is a graph of the transmission profile vs. wavelength for a fiber sensor before the sensor has been embedded in a structure.
Figure 8:
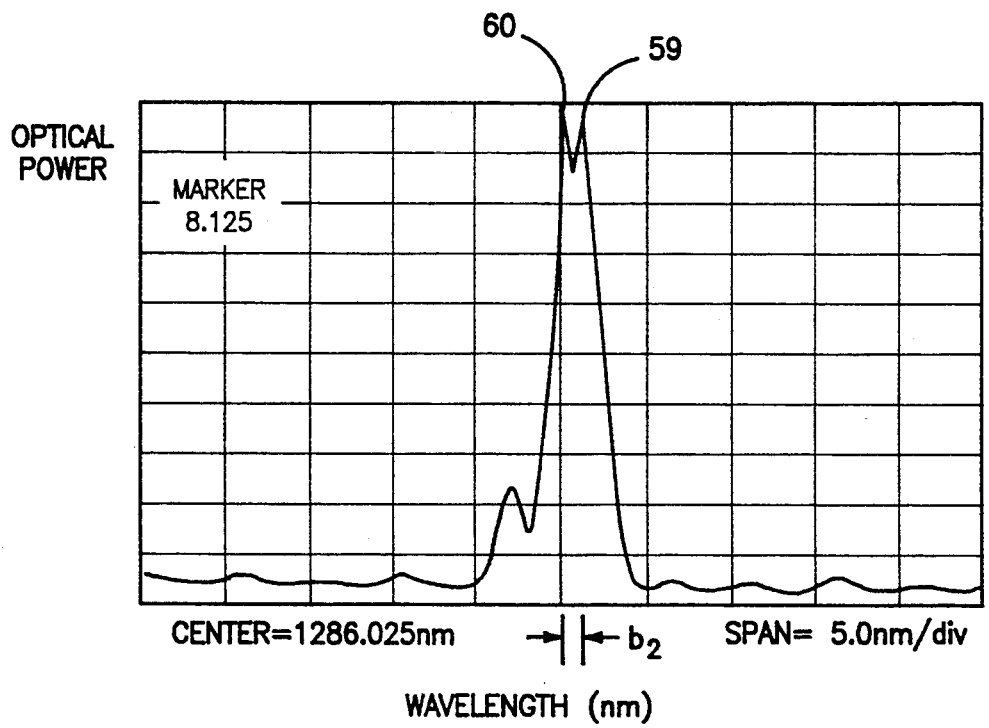
FIG. 8 is a graph of the sensor reflection profile vs. wavelength for the fiber sensor of FIG. 7 after the sensor has been embedded in a structure having adjacent layer filaments parallel to the fiber, in accordance with the present invention.

In particular, referring to FIG. 7, before being embedded in a structure, a fiber sensor has a single local minimum in its transmission profile at a predetermined wavelength, e.g., 1284.38 nanometers, as indicated by a point 58. Referring to FIG. 8, when the fiber sensor of FIG. 7 is embedded in a structure having the adjacent filaments 22 parallel to the fiber 21 (FIG. 6), and having a lay-up of: [same] [0,+45,−45,90,90,−45,+45,0] fiber [0,+45,−45, 90,90,−45,+45,0] [same] [same] [same] (the angles measured from the longitudinal axis of the fiber), the reflectivity profile exhibits two local peaks 59,60 in reflectivity having a small wavelength separation b2, e.g., 0.125 nanometers.

The small wavelength separation b2 (FIG. 8), exists due to the unequal transverse stresses in the fiber created by the existence of and orientation of the other layers of the composite structure. The dramatic change in birefringence from that of FIG. 5 to FIG. 8 is, thus, due solely to the orientation of the filaments of the adjacent layers 10,12 relative to the fiber. This shows that the orientation of the two layers immediately above and below the fiber 21 and the corresponding creation of the eye-shaped resin-rich region 40 (FIG. 3) are dominant factors in creating the fiber birefringence.

It should be understood that the transmission profiles of FIGS. 4,7 indicate the power and wavelength distribution of light 34 (FIG. 1) that passes through the grating 28 and the reflectivity profiles of FIGS. 5,8 indicate the power and wavelength distribution of the light 32 (FIG. 1) reflected by the grating 28.

Figure 9:
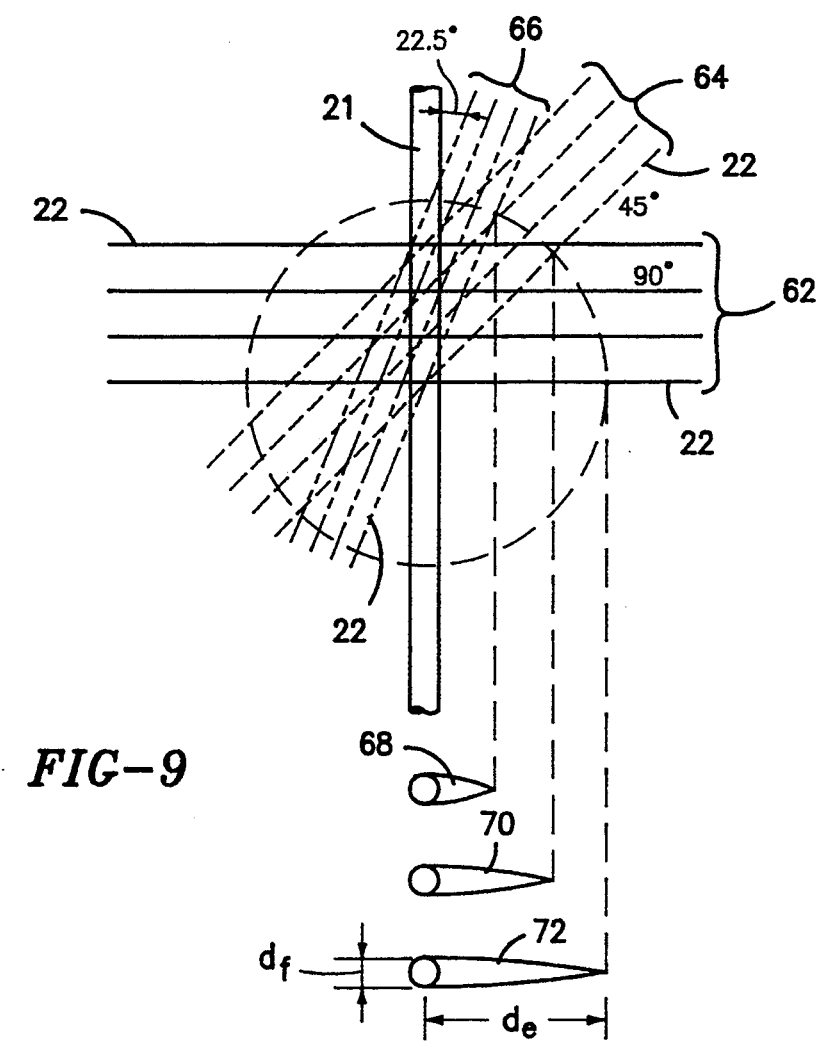
FIG. 9 is a diagram showing a top view of various possible angles for the layers adjacent to the embedded fiber and a corresponding cross-sectional side view of the fiber and eye-shaped resin-rich region which is formed, in accordance with the present invention.
Figure 10:
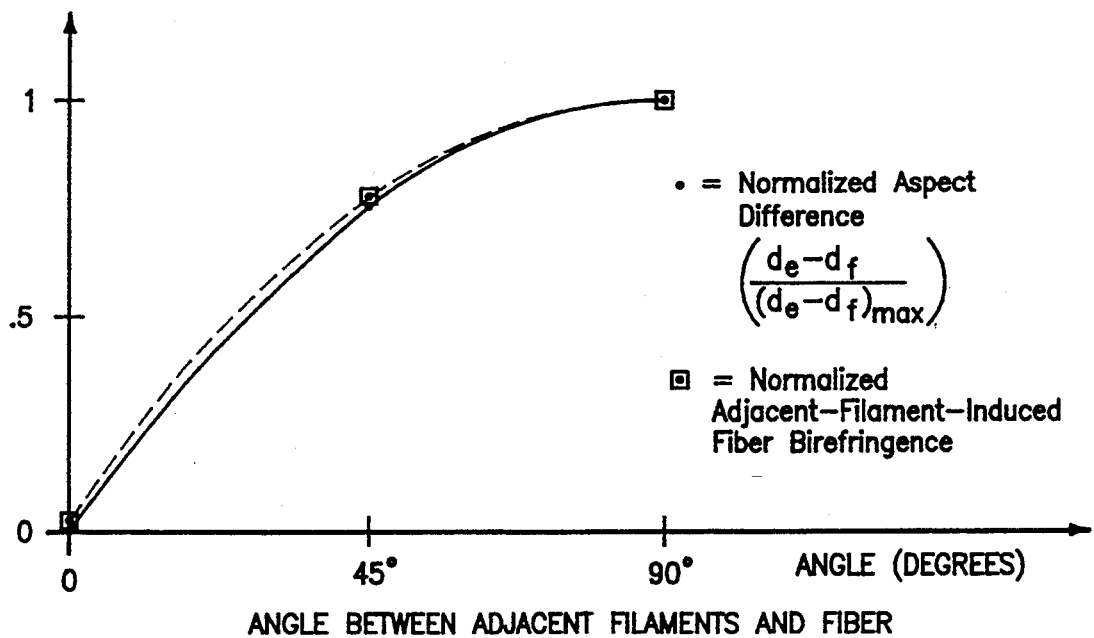
FIG. 10 is a graph of the normalized aspect ratio and the fiber birefringence vs. the angle of the layers adjacent to the embedded fiber, in accordance with the present invention.

Referring now to FIGS. 9 and 10, the diameter $d_f$ of the fiber 21 is compared to the diameter do of the eye-shaped region 40 (FIG. 3) for various different orientations of the filaments of the adjacent layers 10,12 to the fiber. In particular, when the filaments 22 are oriented at 90,45,22.5 degrees from the fiber 21 as indicated by the lines 62,64,66, respectively, the eye shapes are indicated as shapes 68,70,72, respectively. For the orientation in FIGS. 1,3, i.e., 90 degree adjacent filaments, the diameter $d_e$ of the eye is maximized and the birefringence is also maximized. Conversely, for the orientation in FIGS. 6, i.e., 0 degree adjacent filaments, the diameter $d_e$ of the eye is minimized and the birefringence also minimized.

Referring now to FIG. 10 and Table 1, the plotted relationship in FIG. 10 between the normalized aspect difference $(d_e-d_f)/(d_e-d_f)max$ and filament orientation and between normalized fiber birefringence and filament orientation was derived from empirical data of Table 1. As can be seen from Table 1 and FIG. 10, the normalized birefringence and the normalized aspect difference are correlated with each other.

The aforementioned discussion dealt with the creation of and changes in transverse stresses in the grating 28 with respect to temperature, which directly relates to the creation of and change in birefringence of the grating 28. However, it should be understood that the fiber 21 also expands and contracts in the longitudinal (Z-axis) direction due to temperature changes which changes the spacing (spatial periodicity) of the gratings (and the average refractive index), thereby shifting the peak reflection wavelength thereof, as is known. Thus, for the embedded fiber sensor of the invention, a temperature change results in a wavelength shift due to longitudinal changes, and a change in birefringence which appears as a change in the wavelength difference (separation) between the two polarizations.

Regarding externally applied stresses, we have found that there is a negligible effect on the aforementioned transverse stresses (and thus no birefringence) for an external tensile stress applied along the Z-axis (discussed hereinafter). However, the invention will work equally well if this effect is not negligible, as long as the sensitivity to applied strain is not the same as the sensitivity to temperature (discussed more hereinafter).

Figure 11:
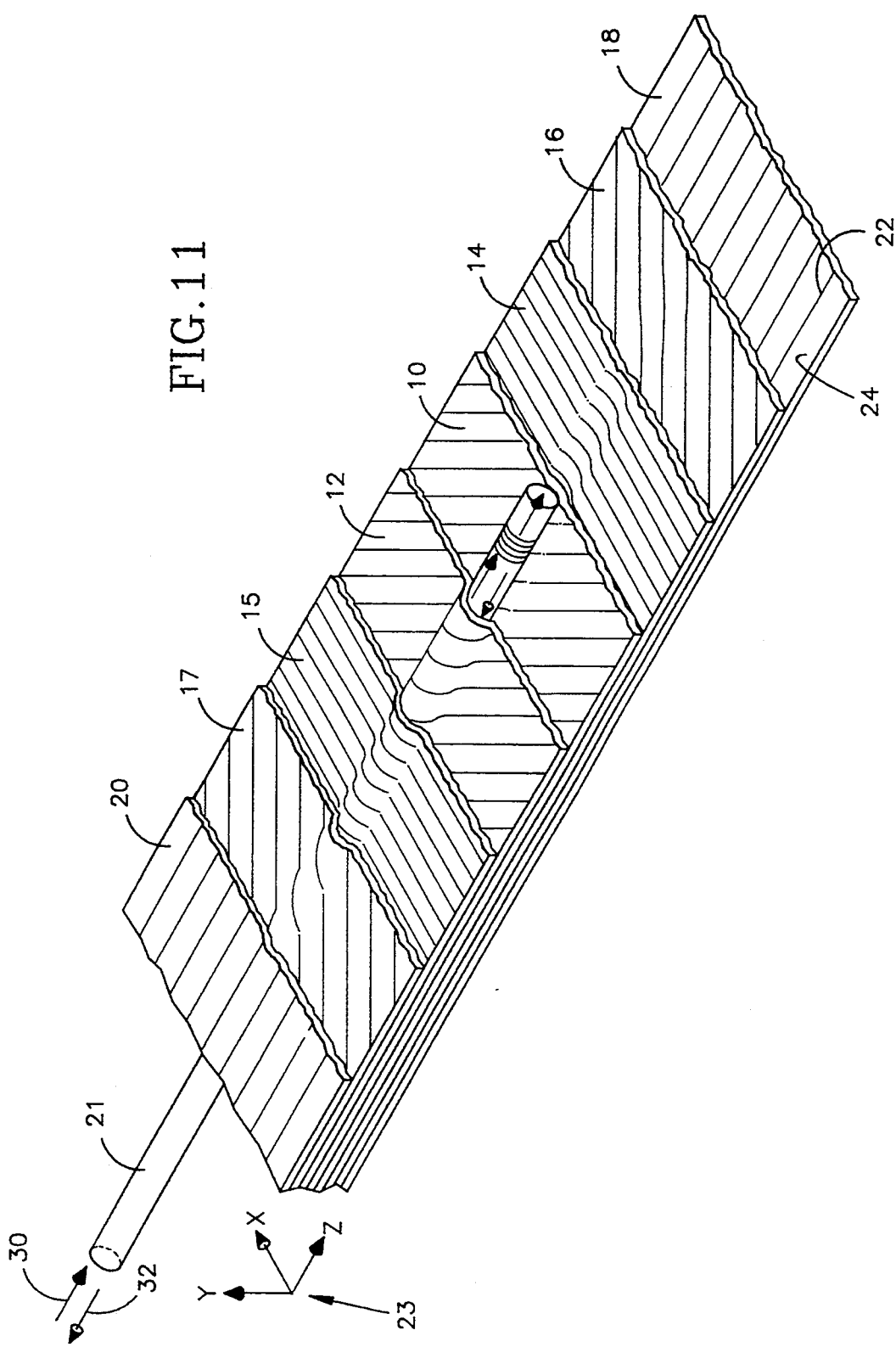
FIG. 11 is a cut-away perspective view of a plurality of layers having reinforcing filaments in an alternative embodiment making up a laminated structure having an optical fiber embedded therein, in accordance with the present invention.

Referring now to FIG. 11, instead of the lay-up of FIG. 1, other lay-ups may be used if desired, provided unequal transverse strains exist in the grating. The orientation of the filaments 22 of the adjacent layers 10,12 to the fiber 21 will be determined by the desired amount of birefringence. In particular, the pattern of FIG. 11 is: [0,+45, 90, −45] fiber [−45, 90,+45, 0]. Also, the number of bracketed sets of layers above and below the fiber has a minimal effect on fiber birefringence. For example, the lay-up of FIG. 11 was fabricated having 8 sets above and below the fiber, that is: [7 more same] [0,+45, 90, −45] fiber [−45, 90,+45, 0] [7 more same].

Referring now to FIGS. 1 and 11, as is known, when a fiber with Bragg gratings is embedded in a structure and used as a sensor, a broadband unpolarized light 30 is injected into one end of the fiber 21, as discussed in the aforementioned U.S. Patents to Meltz et al. The grating 28 reflects a predetermined narrow wavelength band of return light 32, thereby allowing the remaining wavelengths to pass through the grating 28, as the light 34. The return light 32 is analyzed, e.g., by a spectrum analyzer (not shown), to determine the wavelength shift caused by changes in strain and temperature of the structure it is embedded within.

Figure 12:
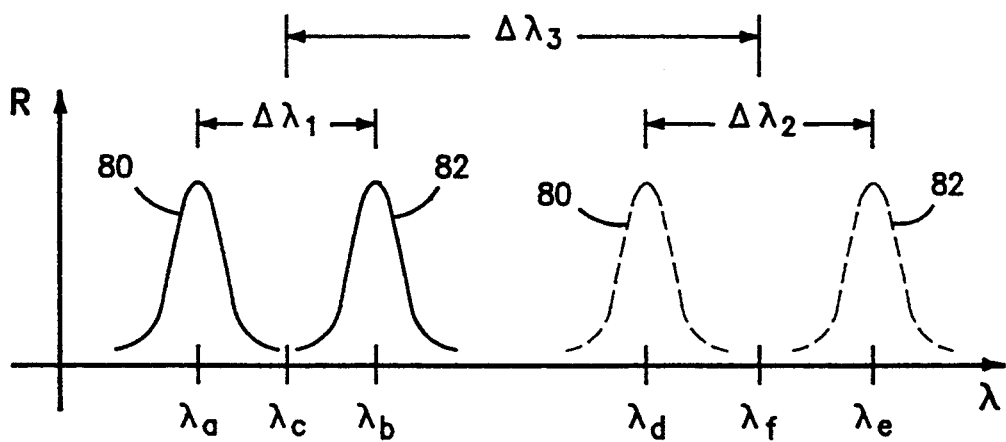
FIG. 12 is a graph of the reflectivity curves for a Bragg grating showing the peak wavelength separation and the peak and average wavelength shifts due to temperature and strain, in accordance with the present invention.

Referring now to FIG. 12, due to the birefringence created in the fiber 21 caused by the lay-up of the invention, we have also found that the reflectivity spectrum of the grating 28 (FIG. 1) has two features regarding the polarization axes associated with the birefringence. In particular, due to the birefringence, the fiber grating 28 (FIG. 1) exhibits a first reflectivity curve 80 centered at a wavelength λa associated with a first polarization axis (or state) of the birefringent-induced fiber grating 28. Also, a second reflectivity curve 82, centered at a wavelength λb is associated with a second or orthogonal polarization axis (or state) of the birefringent-induced fiber grating 28.

The wavelength spacing $\Delta\lambda_1$ between the peak reflection wavelengths λa,λb for the reflectivity curves 80,82, respectively, is indicative of the birefringence induced in the fiber grating 28. Thus, when the broadband unpolarized light 30 (FIG. 1) is incident on the grating 28, the strongest intensity of return light 32 is at substantially two wavelengths, λa,λb, where λa is polarized along the first polarization axis and λb is polarized along the second polarization axis, due to the birefringence in the grating 28. It should be understood that the orientation of the polarization axes are not necessarily aligned with the coordinate axes 23 of FIG. 1 but are instead related to the direction of the stress vectors imposed in the fiber grating 28.

When the structure is exposed to a change in external strain and/or temperature, the central or average wavelength λc half-way between the two peaks λa,λb shifts to a new average wavelength λf, a distance $\Delta\lambda_3$ from λc, due to a change in the periodic spacing of the grating 28 (and the average refractive index of the core). Also, the spacing between the two wavelengths changes from $\Delta\lambda_1$ to $\Delta\lambda_2$, where the reflectivity curve 60 corresponding to the first polarization axis has a new central wavelength λd and the reflectivity curve 82 corresponding to the orthogonal polarization has a new central wavelength λe. We have found that, for the lay-ups discussed hereinbefore, the temperature and strain sensitivity with respect to the shift in average wavelength $\Delta\lambda_3$ (λf-λc) is different from the temperature and strain sensitivity with respect to the spacing between the wavelength peaks $\Delta\lambda_2-\Delta\lambda_1$.

More specifically, the shift in average wavelength $\Delta\lambda_3$ can be described by the following equation:

$$\Delta\lambda_3 = \Delta\lambda_{shift} = A_T \Delta T + B_\epsilon \Delta\epsilon \quad (1)$$

Figure 13:
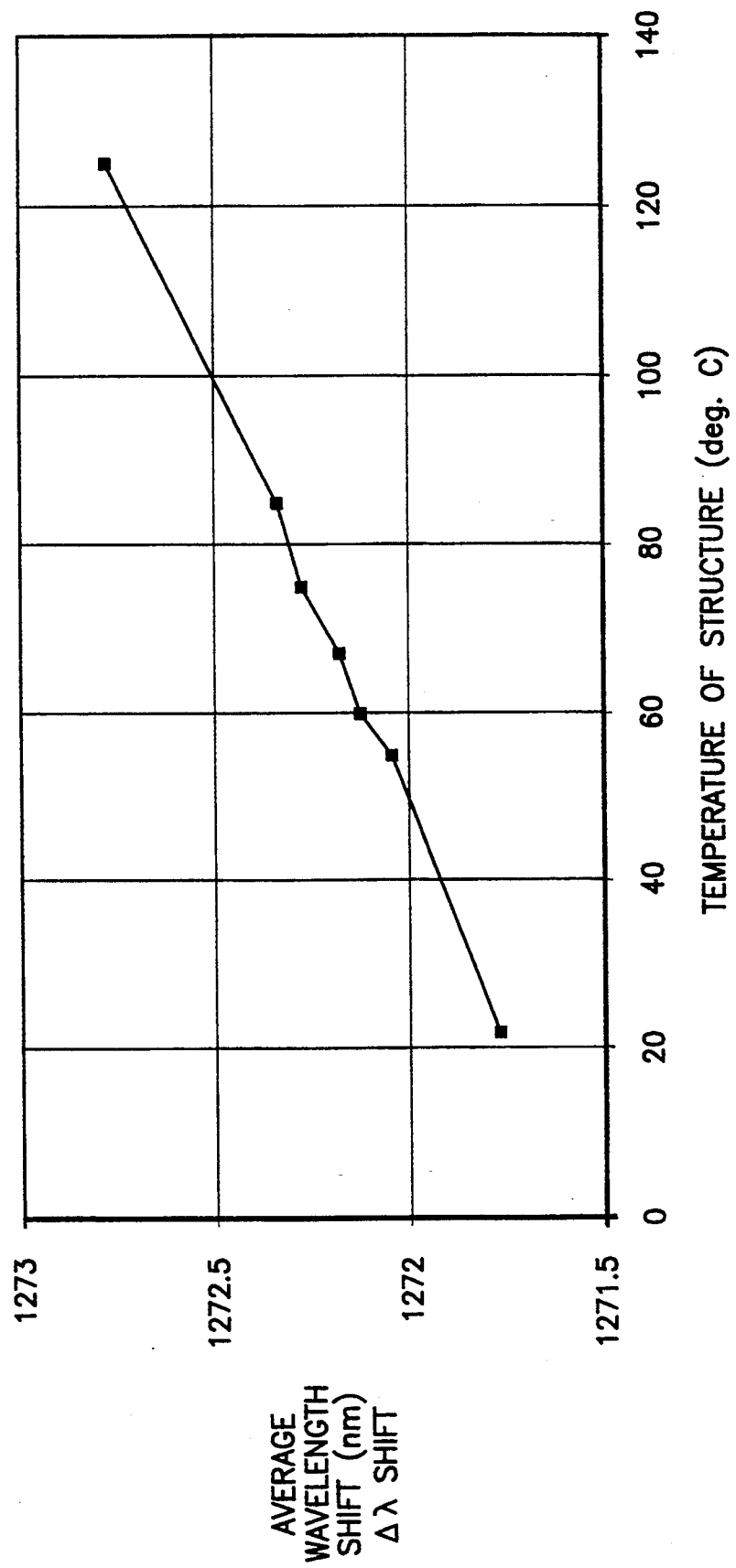
FIG. 13 is a graph of the average wavelength change for an embedded optical fiber sensor vs. the applied structure temperature, which shows a highly linear relationship, in accordance with the present invention.
Figure 14:
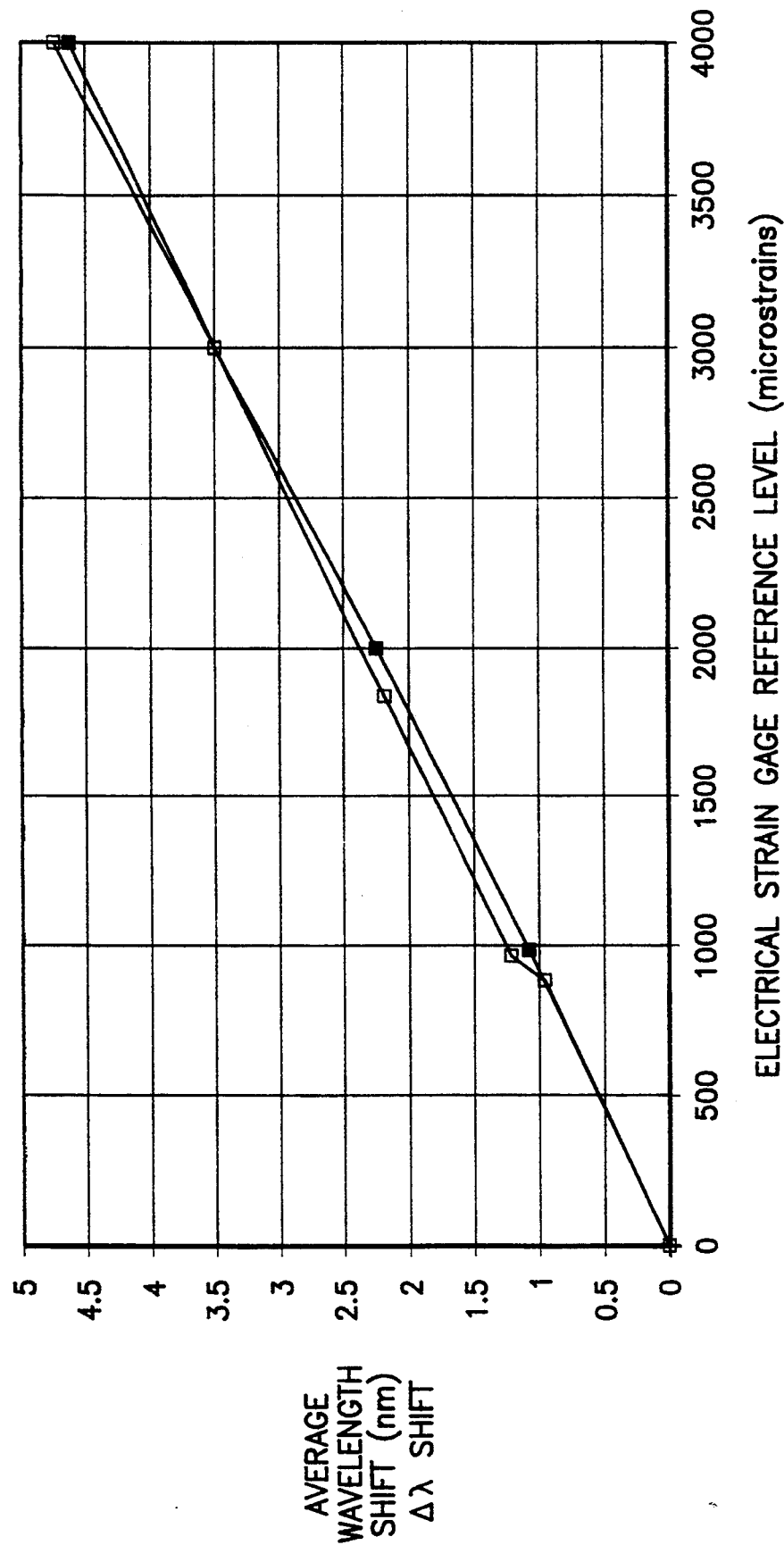
FIG. 14 is a graph of the average wavelength shift for an embedded optical fiber sensor vs. applied structural strain applied showing a highly linear relationship, in accordance with the present invention.

Referring to FIGS. 13 and 14, we have found experimentally that, for the lay-up of FIG. 11, $A_T = 9.82 \times 10^{-3}$ nm/° C., and $B_\epsilon = 1.17 \times 10^{-3}$ nm/µε.

Also, the change in peak wavelength spacing (or separation) as a function of temperature and strain is defined by the following equation:

$$(\Delta\lambda_2 - \Delta\lambda_1) = \Delta\lambda_{spacing} = C_T \Delta T + D_\epsilon \Delta\epsilon \qquad (2)$$

Figure 15:
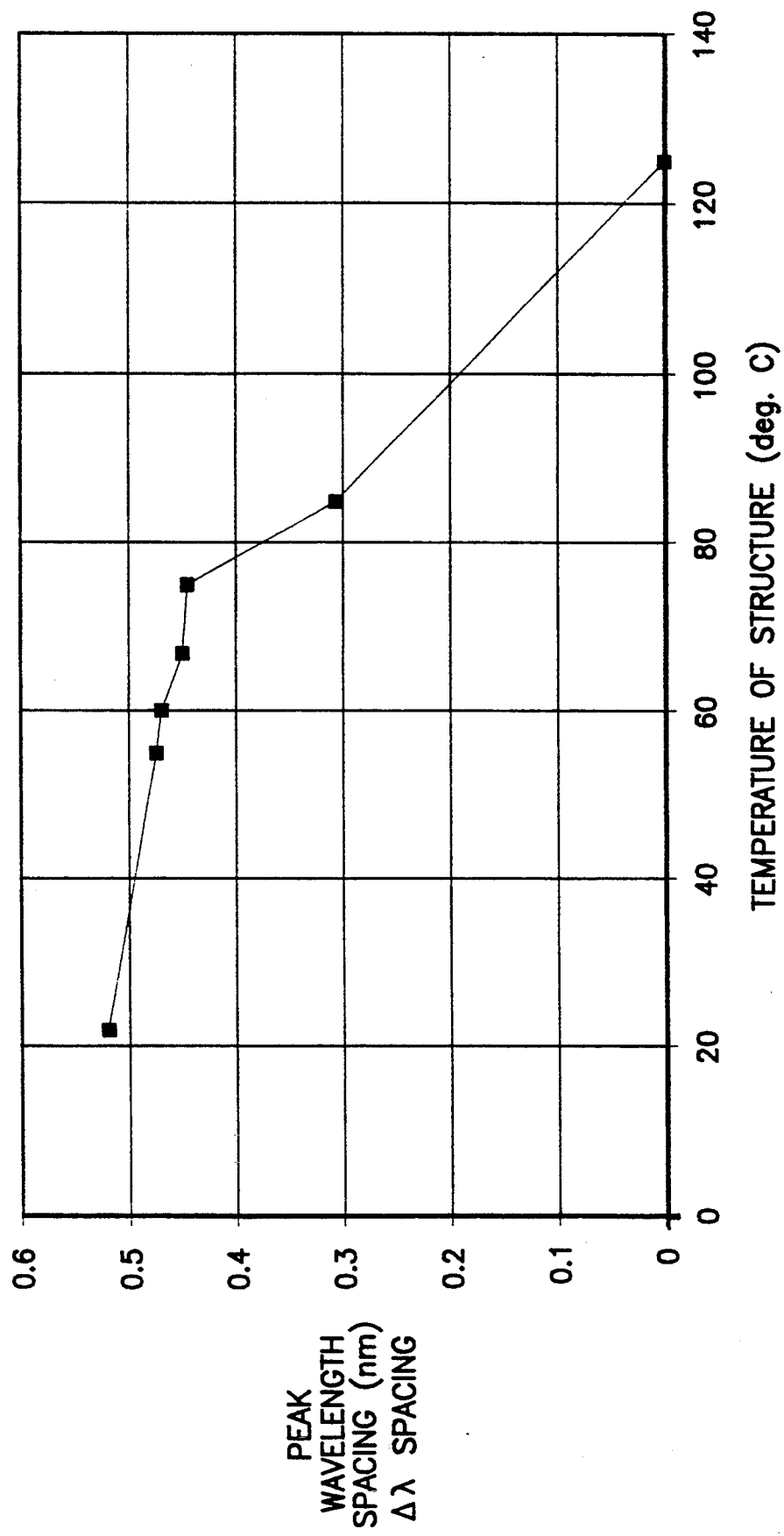
FIG. 15 is a graph of the peak wavelength separation for the embedded optical fiber sensor vs. applied structural temperature showing two-piecewise linear portions of the response, in accordance with the present invention.
Figure 16:
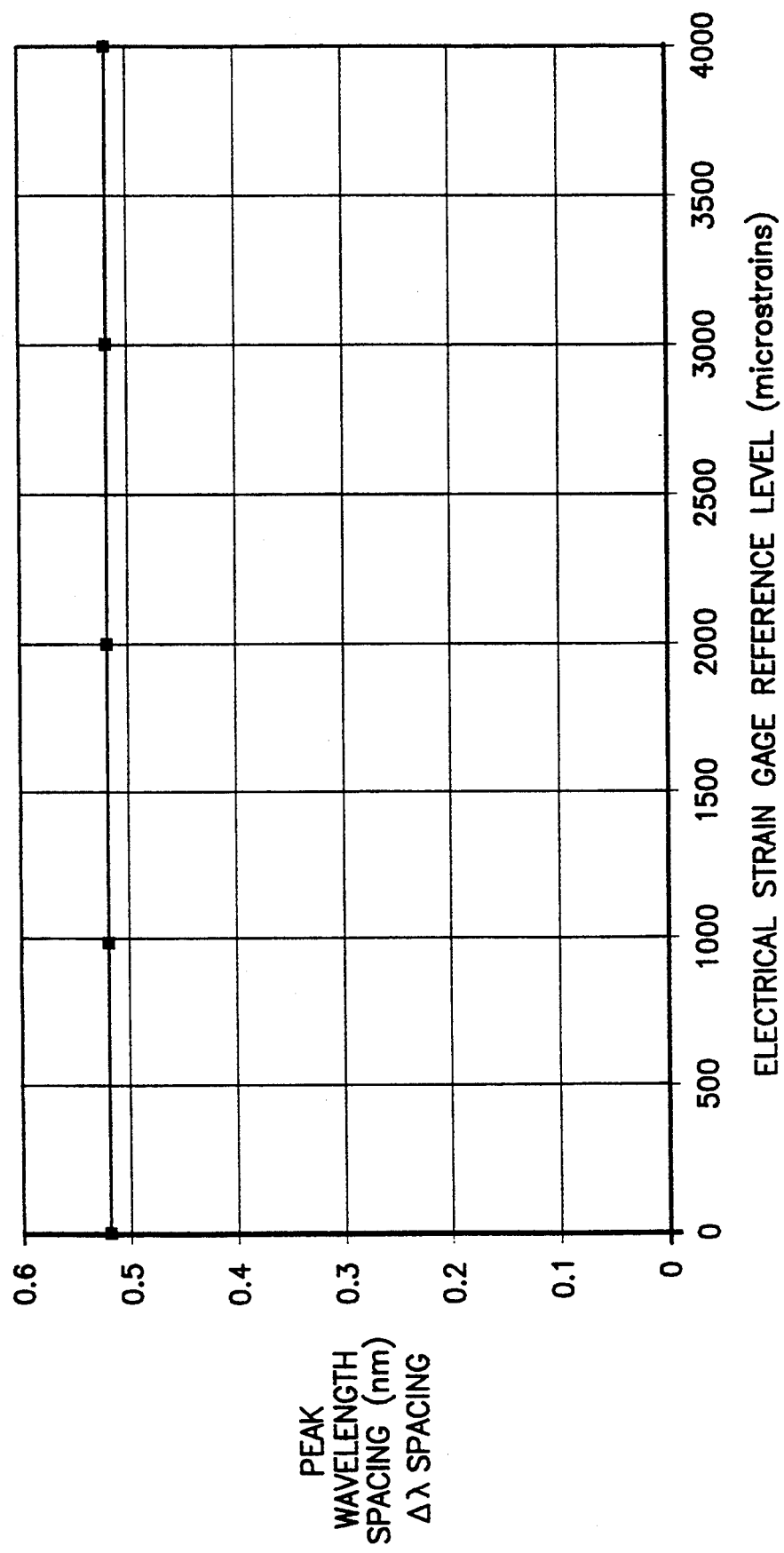
FIG. 16 is a graph of the peak wavelength separation of an embedded optical fiber sensor vs. the applied structural strain showing a substantially negligible sensitivity to structural strain, in accordance with the present invention.

Referring to FIG. 15, we have found experimentally that, for the lay-up of FIG. 11, $C_T = -1.44 \times 10^{-3}$ nm/° C. for temperatures between 20° C. and 75° C. and $C_T = -8.53 \times 10^{-3}$ nm/° C. for temperatures between greater than 75° C. Also, $D\epsilon$ is approximately equal to zero for the lay-up of FIG. 11, as indicated by the slope of the graph in FIG. 16 (discussed hereinbefore). Other values for the coefficients in equations 1 and 2 may be obtained if different materials, lay-ups, and/or consolidation processes are used. Thus, a calibration procedure should be performed to determine these coefficients for a given lay-up, material, and process combination.

As a result, in general, the invention provides two independent measurements useful in solving the above equations (Eq. 1 and Eq. 2) for the two unknowns (temperature and strain). However, if $D\epsilon$ is negligible, as it is for the lay-up of FIG. 11, the $\Delta\lambda_{spacing}$ is directly proportional to the change in temperature and thus the temperature may be obtained merely by measuring the change in wavelength spacing using the value of the coefficient $C_T$ indicated hereinbefore. However, if $D\epsilon$ is not approximately equal to zero, then the coefficient $C_T$ may be generated by curve fitting the data relating to the peak wavelength spacing vs. strain to an equation which is a function of temperature T, and then the two equations (Eq. 1 and Eq. 2) may be solved simultaneously for temperature and strain using known techniques. Any other known technique for reducing the data of FIGS. 13–16 may be used if desired.

Furthermore, it should be understood that the fiber 21 (FIG. 1) should be intimately bonded with the surrounding layers 10–20 of the structure 8.

Although the invention has been described as using the quasi-isotropic lay-ups of FIGS. 1 and 11, it should be understood that any lay-up configuration of the filaments 22 may be used provided the stress on the fiber 21 in the X-axis direction is different from the stress on the fiber in the Y-axis direction (stress in the two transverse directions are not equal), so as to create the needed birefringence in the grating 28. As discussed hereinbefore, a symmetric lay-up may be used to cancel the stresses across the overall device and thereby avoid curling of the structure.

Figure 17:
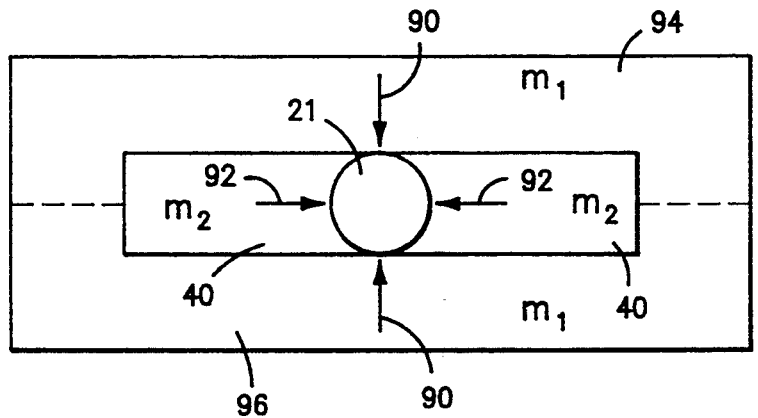
FIG. 17 is a diagram of a general embodiment for creating unequal transverse stresses, in accordance with the present invention.

Referring now to FIG. 17, the region 40 need not be eye-shaped as shown in FIG. 3 but may have any shape that allows such unequal transverse stresses to exist in the fiber. It suffices for the present invention that a medium M1 exert vertical (Y-axis) forces on the fiber as indicated by the arrows 90 and a medium M2, by itself or together with forces exerted by M1, exert substantially perpendicular (X-axis) forces as indicated by the arrows 92 and that the force exerted along 92 is not equal to the force exerted along 90 and this difference in forces changes with temperature. Further, the medium 94 above the fiber need not be the same as the medium 96 below the fiber. Further, the medium M1 need not be made of filaments and resin, and the medium M2 need not be made of resin. For example, the medium M2 may actually be a nonsolid medium, such as a gas or a liquid.

Also, it should be understood that the only place where birefringence is required to exist is in the grating 28 (FIG. 1) where the sensing is to occur (i.e., not in the other locations along the fiber). Because there are two different light wavelengths returning from the grating, a lack of birefringence in the other portions of the fiber 21 will not preclude sensing these wavelengths. However, for maximum signal strength, the fiber (both inside and outside the structure) should be polarization preserving and properly oriented within the structure. For the embodiments shown in FIGS. 1 and 11, the whole section of the fiber 21 within the structure is under the same unequal transverse stresses residual as the grating area; thus, fiber birefringence is maintained for the length of the fiber within the structure.

Furthermore, the invention may be implemented with a plurality of gratings in series, similar to that discussed in the aforementioned U.S. Patents to Meltz et al. Furthermore, alternatively, the measurement may be performed in transmission instead of in reflection, as described in the aforementioned U.S. Patents to Meltz et al. In that case, the return light measured is light transmitted through the grating instead of light reflected from it; thus, instead of measuring reflected wavelength peaks, transmitted wavelength valleys are measured. It should be understood that light which is transmitted is merely the complement of the light which is reflected. Thus, the same grating may be used in either (or both) of these modes.

Also, instead of using a Bragg grating, any other reflective element may be used that exhibits a birefringent character under unequal transverse residual stresses. Still further, instead of the fiber 21, any optical waveguide may be used to transport the light to and from the grating 28. Also, the grating (or reflective element) 28 may be embedded in any form of optical waveguide, e.g., a thin film device.

Further, although the orientation of the adjacent filaments are discussed with respect to the longitudinal axis of the fiber 21, it should be understood that, because it is the birefringence in the grating which is important for the invention, the aforementioned orientations need only be with respect to the longitudinal axis of the grating (or other reflective element).

Also, instead of using a fiber that has no birefringence before being embedded in the structure of the invention, a birefringent fiber may be used. In that case, the birefringence induced by the invention may add to or subtract from the existing birefringence of the fiber.

Furthermore, more than one fiber may be used in the structure, if desired. Also, the invention can be used as a technique to design a structure which has the fiber(s) embedded within it, to fabricate small "patch" sensors comprising this lay-up which are bonded to other structures for sensing independent temperature and/or strain thereof.

Still further, instead of having the filaments in each layer being parallel to each other, a two dimensional weave may be used for each layer, i.e., filaments running in at least two directions within the plane of the layer, provided unequal net perpendicular transverse thermal expansion coefficients exists at the fiber cross-section. Alternatively, a three dimensional weave may be used, with filaments running between layers as well as in two directions within a layer, provided cross transverse stresses are induced in the grating 28.

Even though the invention has been described as using layers comprising filaments with resin therebetween, the invention will work equally well with layers having any composition that renders unequal net perpendicular transverse thermal expansion coefficients exist at the fiber cross-section.

Also, the invention may be employed with a set of two or more reflective elements configured as a Fabrey Perot resonator cavity or as a laser cavity using a birefringent arrangement, such as that discussed in copending U.S. patent application Ser. No. 08/069,231, entitled "Active Multipoint Fiber Laser Sensor", where all or some of the birefringence is induced by the invention.

Although the invention has been described and illustrated with respect to the exemplary embodiments thereof, it should be understood by those skilled in the art that the foregoing and various other changes, omissions and additions may be made without departing from the spirit and scope of the invention.

TABLE 1

DATA FOR GRAPH OF FIG. 10

| Angle (deg) | Wavelength Spacing $\Delta\lambda$ (nm) | Normalized (Birefringence) Wavelength Spacing | Relative Diameters ($\mu$m) $d_e$ | $d_f$ | $\dfrac{d_e - d_f}{(d_e - d_f)_{max}}$ |
|---|---|---|---|---|---|
| 90 | 0.6 | 1.00 | 1404. | 130. | 1.00 |
| 45 | 0.47 | 0.78 | 1092. | 130. | 0.76 |
| 0 | 0.06 | 0.01 | 130. | 130. | 0 |

We claim:

1. An embedded optical sensor, comprising:
   an optical waveguide for confining incident light and return light;
   at least one reflective element disposed within said waveguide in the path of said incident light that reflects a portion of said incident light, said reflective element having a first transverse axis and a second transverse axis perpendicular to said first transverse axis, said first and said second transverse axes both being perpendicular to a longitudinal axis;
   transverse stress means, for exerting forces on said reflective element so as to create unequal transverse stresses in said reflective element;
   said unequal transverse stresses creating birefringence in said reflective element, and said unequal transverse stresses changing with temperature thereby causing said birefringence to change with temperature;
   said birefringence causing a first peak reflection wavelength of said reflective element associated with a first polarization axis of said reflective element and a second peak reflection wavelength of said reflective element associated with a second polarization axis of said reflective element;
   a wavelength spacing being the wavelength difference between said first peak and said second peak and an average wavelength being the wavelength half-way between said first peak and said second peak; and
   said wavelength spacing having a sensitivity to temperature and strain which is different from that of said average wavelength, thereby allowing both temperature and strain measurements with said reflective element.

2. The embedded optical sensor of claim 1, wherein said transverse stress means comprises a composite structure surrounding said reflective element.

3. The embedded optical sensor of claim 2, wherein said composite structure comprises reinforcing filaments having a predetermined orientation with respect to said reflective element and a bonding material to hold said structure together.

4. The embedded optical sensor of claim 3, wherein said filaments have a first thermal expansion coefficient and said bonding material between said filaments have a second thermal expansion coefficient, different from said first expansion coefficient.

5. The embedded optical sensor of claim 3, wherein said filaments adjacent to said reflective element are oriented in a direction that is not parallel to said longitudinal axis of said reflective element.

6. The embedded optical sensor of claim 3, wherein said filaments adjacent to said reflective element are oriented in a direction that are perpendicular to said longitudinal axis of said reflective element.

7. The embedded optical sensor of claim 5, wherein said filaments form a contour around said reflective element which has more volume along said second transverse axis than along said first transverse axis.

8. The embedded optical sensor of claim 7, wherein said contour has shape of an eye.

9. The embedded optical sensor of claim 3, wherein said composite structure comprises a plurality of layers each comprising said filaments and said bonding material.

10. The embedded optical sensor of claim 9, wherein each of said layers has unequal net perpendicular in-plane thermal expansion coefficients.

11. The embedded optical sensor of claim 9, wherein said reflective element is surrounded by four of said layers above said reflective element and four of said layers below said reflective element.

12. The embedded optical sensor of claim 9, wherein at least one of said layers have filaments that are oriented in a different direction from filaments in the other of said layers.

13. The embedded optical sensor of claim 3 wherein said bonding material is a polymer matrix.

14. The embedded optical sensor of claim 3 wherein said filaments are made of graphite.

15. The embedded optical sensor of claim 3, wherein said filaments comprise graphite strands.

16. The embedded optical sensor of claim 1, wherein said waveguide is an optical fiber.

17. The embedded optical sensor of claim 1, wherein said reflective element comprises a Bragg grating.

18. An embedded optical sensor, comprising:
   an optical waveguide for confining incident light and return light;
   at least one reflective element disposed within said waveguide in the path of said incident light that reflects a portion of said incident light, said reflective element having a first transverse axis and a second transverse axis perpendicular to said first transverse axis, said first and said second transverse axes both being perpendicular to a longitudinal axis;
   a plurality of layers surrounding said reflective element forming a laminated structure;
   each of said layers being oriented in such a way and being comprised of such materials that when laminated together said layers exert forces on said reflective element so as to create unequal transverse stresses in said reflective element;
   said unequal transverse stresses creating birefringence in said reflective element, and said unequal transverse stresses changing with temperature thereby causing said birefringence to change with temperature;
   said birefringence causing a first peak reflection wavelength of said reflective element associated with a first polarization axis of said reflective element and a second peak reflection wavelength of said reflective element associated with a second polarization axis of said reflective element;

a wavelength spacing being the wavelength difference between said first peak and said second peak and an average wavelength being the wavelength half-way between said first peak and said second peak; and said wavelength spacing having a sensitivity to temperature and strain which is different from that of said average wavelength, thereby allowing both temperature and strain measurements with said reflective element.

19. The embedded optical sensor of claim 18, wherein each of said layers has unequal net perpendicular in,-plane thermal expansion coefficients.

20. The embedded optical sensor of claim 18, wherein said plurality of layers comprises reinforcing filaments having a predetermined orientation with respect to said reflective element and a bonding material to hold said laminate structure together.

21. The embedded optical sensor of claim 20, wherein said filaments have a first thermal expansion coefficient and said bonding material between said filaments have a second thermal expansion coefficient, different from said first expansion coefficient.

22. The embedded optical sensor of claim 20, wherein said filaments adjacent to said reflective element are oriented in a direction that is not parallel to said longitudinal axis of said reflective element.

23. The embedded optical sensor of claim 20, wherein said filaments adjacent to said reflective element are oriented in a direction that are perpendicular to said longitudinal axis of said reflective element.

24. The embedded optical sensor of claim 23, wherein said filaments form a contour around said reflective element which has more volume along said second transverse axis than along said first transverse axis.

25. The embedded optical sensor of claim 24, wherein said contour has shape of an eye.

26. The embedded optical sensor of claim 18, wherein said reflective element is surrounded by four of said layers above said reflective element and four of said layers below said reflective element.

27. The embedded optical sensor of claim 20, wherein said filaments of at least two of said layers above said reflective element are oriented in different directions.

28. The embedded optical of claim 20 wherein said bonding material is a polymer matrix.

29. The embedded optical sensor of claim 20, wherein said filaments are made of graphite.

30. The embedded optical sensor of claim 20, wherein said filaments comprise graphite strands.

31. The embedded optical sensor of claim 18, wherein said waveguide is an optical fiber.

32. The embedded optical sensor of claim 18, wherein said at least one reflective element comprises a Bragg grating.

* * * * *